3,505,234
SODIUM CHLORIDE DE-ICING COMPOSITION WITH ALKALI METAL IRON CYANIDE AND CALCIUM OR MAGNESIUM CHLORIDE
Werner Pinckernelle, Hannover-Kirchrode, and Leonore Gentsch, Hannover, Germany, assignors to Salzdetfurth Aktiengesellschaft, Hannover, Germany
No Drawing. Filed Mar. 29, 1965, Ser. No. 443,686
Int. Cl. C09k 3/18
U.S. Cl. 252—70     1 Claim

ABSTRACT OF THE DISCLOSURE

A non-caking de-icing composition contains for each 1000 kg. of NaCl 5 to 75 g. of a water soluble alkali metal salt of an iron cyanide, and 5 to 40 kg. of calcium or magnesium chloride.

---

This invention relates to de-icing compositions suitable for the winter maintenance of roads and similar icy surfaces.

The use of sodium chloride in the form of rock salt or in other commercially available forms is well known for preventing or removing the dangers of slippery road surfaces in winter. Also known are de-icing compositions containing, in addition to rock salt, magnesium and/or calcium chloride in amounts of more than 15 percent. However, rock salt alone as well as said mixtures have the tendency, depending on the climatic conditions, to cake and to form more or less large lumps. Such caked products have no longer the free flowing properties required for use in mechanical spreaders. In addition, they are quite expensive, due to the high content of alkaline earth metal chlorides.

A great number of ingredients has been proposed to prevent the caking of such de-icing compositions which is caused by recrystallization. One of the best groups of such caking inhibitors are the water soluble ferro and ferricyanides, especially their alkali metal salts. However, also additions of such salts do not have the desired effect when such salt mixtures are subjected in winter weather in open air storage to alternating wetting and drying at temperatures below the freezing point. The frozen mixtures must then be crushed or granulated again to become spreadable.

It is a principal object of the invention to prevent caking and freezing of de-icing compositions under all weather conditions which may be encountered in practice.

It is another object of the invention to provide a de-icing composition which remains spreadable for long periods of time also at very low temperatures and which, even at repeated temperature oscillations, has no tendency to freezing and caking. Such compositions shall remain readily available during any kind of winter weather.

It is still another object of the invention to eliminate protective measures otherwise required to retain the effectiveness, and especially the spreadability, of the de-icing composition, such as wrapping materials, storage facilities, and the like.

Further objects of the invention include the provision of de-icing compositions which during handling and use do not dust, which is important for the shipping and spreading manipulations.

The above avantages are realized by a composition which consists of sodium chloride to which have been admixed in homogeneous distribution about 5 to 75 g. of a soluble iron cyanide and about 5 to 40 kg. of magnesium chloride and/or calcium chloride, calculated on 1000 kg. of sodium chloride. The amounts of the alkaline earth metal chloride are calculated as anhydrous salts, though they may be used in the form of their hydrates.

Suitable water soluble iron cyanides are their alkali metal salts, particularly potassium and sodium ferrocyanide and ferricyanide.

Our novel composition can be prepared by careful blending of the dry components as well as by spraying a solution of the additives into moving or agitated sodium chloride.

When the ingredients are mixed in the solid state, it is of advantage to prepare a premix by adding the additives to a portion of the sodium chloride only, for instance to about 5 percent of the total NaCl, and then mixing said premix in a second mixer with the balance of the sodium chloride. The latter may be employed as rock salt or in a like coarse form. Also the residual salt obtained as tailings in the recovery of potassium chloride from crude salt can be employed.

If the alkaline earth metal chlorides are employed in form of their solutions, the calcium chloride solutions obtained as by-product in the production of Solvay soda may be used, and the magnesium chloride is readily available from the liquors remaining in the potash industry.

The following examples illustrate the manner in which our invention may be practiced.

EXAMPLE 1

1000 kg. of rock salt of the conventional grain size of 0 to at most 5 mm. and a solution containing 8.5 kg. of magnesium chloride and 20 g. of potassium ferrocyanide in 20 kg. of water were mixed in a high speed mixer for 60 to 120 seconds. The solution of the additives may be introduced into the mixer all at once, or the addition may be distributed over the entire mixing period. A simpler method is to spray the solution into the mixer.

The thus obtained composition was stored near Hannover, Germany for 1 year in an open shed where it was subjected to the influence of fog and humidity and to temperatures above and below freezing. After that time, the composition did not show any sign of hardening, and it did not freeze together even at lowest temperatures. In spite of the extreme temperature variations between winter and summer, the composition retained its excellent spreading properties.

EXAMPLE 2

20 g. of potassium ferrocyanide, dissolved in 400 g. of water, were stirred into 22 liters of a residual liquor from the processing of carnallite and containing, in addition to 20 kg. of water. 7.4 kg. of magnesium chloride, 0.3 kg. of sodium chloride, 0.3 kg. of potassium chloride, an 0.7 kg. of magnesium sulfate. Said solution was added, as set forth in Example 1, to 1000 kg. of rock salt and intimately blended therewith.

The thus treated salt was stock-piled for 1 year in the open air under the same conditions as described in Example 1. Also this composition retained its excellent spreading properties even at the lowest temperatures and did not show any tendency of caking by freezing or hardening.

EXAMPLE 3

1000 kg. of the rock salt used in Example 1 were carefully blended with 50 kg. of finely ground $MgCl_2 \cdot 6 H_2O$ (solid) and 20 kg. of an aqueous solution containing 20 g. of potassium ferrocyanide.

The thus obtained composition was subjected to the conditions recited in Example 1. It did neither freeze nor cake and remained at all times suitable for spreading.

The above examples describe spreadable de-icing compositions which under varying temperature conditions and after 12 months' storage in an open shed neither cake nor freeze together and remain suitable for the use in spreaders.

The even distribution of the relatively small amounts of additives which are incorporated for the prevention of caking and freezing, is, of course, more readily and completely accomplished by employing the same in the dissolved instead of the solid state.

On storage under the usual climatic conditions, the novel compositions take up moisture in an amount of about 2 to 3 percent of their weight.

The following comparative examples show that the effect of the additives is due to a synergism and is not shown by addition of the individual salts.

COMPARATIVE EXAMPLE A 1000 kg. of the rock salt used in Example 1 were mixed with 20 kg. of an aqueous solution containing 20 g. of potassium ferrocyanide.

The mass froze at a temperature of $-11°$ C. to a solid cake and was no longer spreadable.

COMPARATIVE EXAMPLE B

To 1000 kg. of the rock salt used in the previous examples, there were admixed 20 kg. of an aqueous solution containing 8.5 kg. of magnesium chloride, and the composition was stored in an open air shed. Due to the alternating temperature conditions above and below the freezing point, the salt was caked already after a short time and could no longer be spread.

We claim:
1. A non-caking de-icing composition consisting of sodium chloride and containing for 1000 kg. thereof about 5 to 75 grams of a water soluble alkali metal salt of an iron cyanide and 5 to 40 kg. of a chloride of a metal of the group consisting of calcium and magnesium, the amount of said chloride being calculated as anhydrous salt.

References Cited

UNITED STATES PATENTS 3,378,493    4/1968    Jacoby et al. _____ 252—70

MAYER WEINBLATT, Primary Examiner

I. GLUCK, Assistant Examiner

U.S. Cl. X.R.

23—89; 252—385